Figure 4:
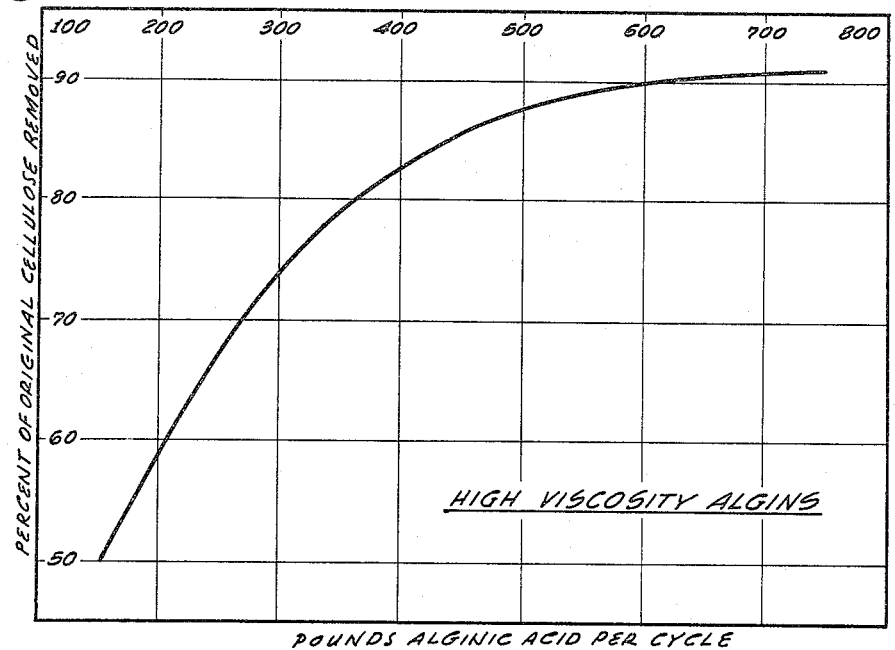

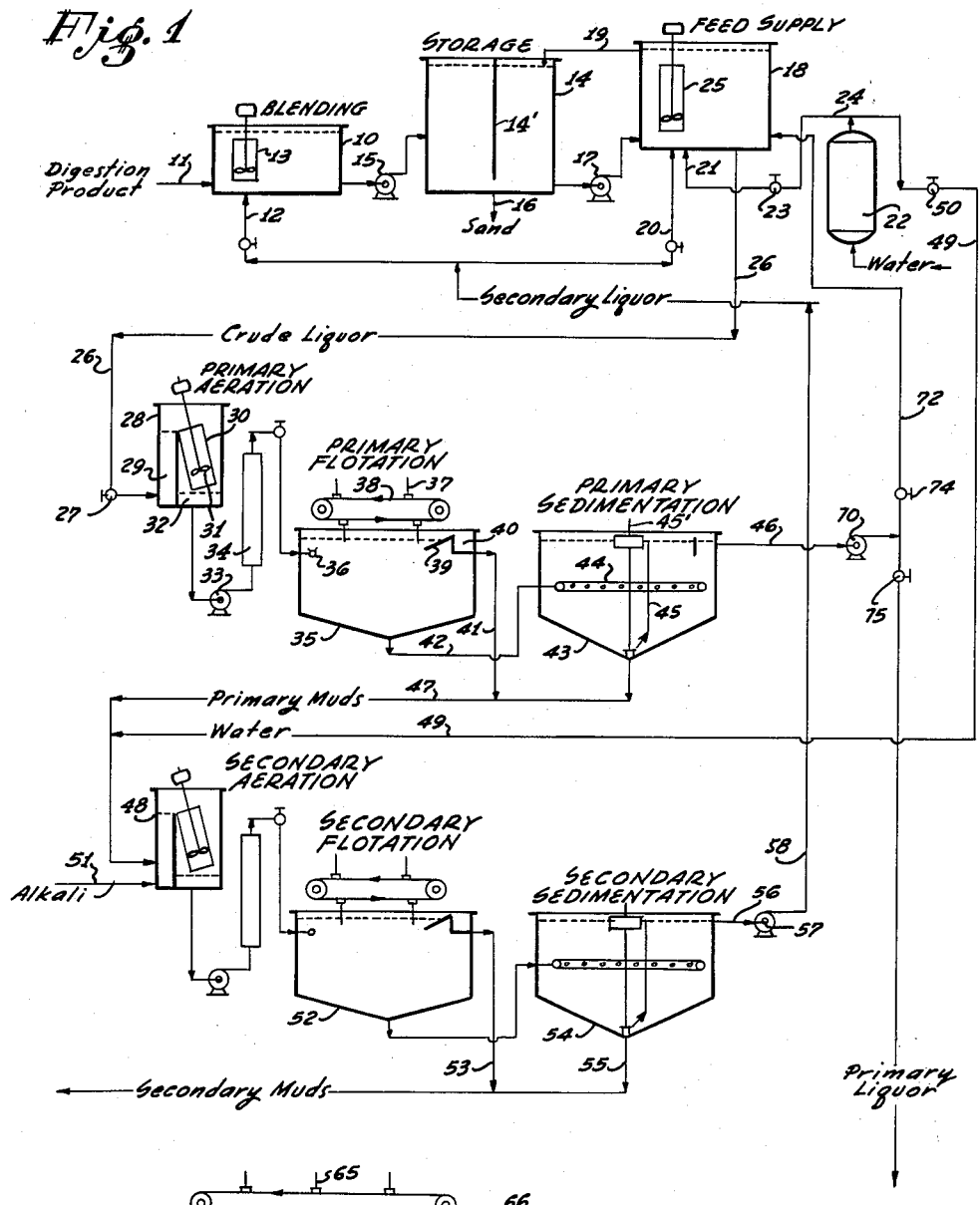

INVENTORS:
Arthur W. Saddington
Geoffrey R. Tully, Jr.

United States Patent Office 2,742,423
Patented Apr. 17, 1956

2,742,423
METHOD OF CLARIFYING CRUDE SOLUTIONS OF ALGINATES

Arthur W. Saddington, La Mesa, and Geoffrey R. Tully, Jr., Walnut Creek, Calif.

Application January 10, 1955, Serial No. 480,978

22 Claims. (Cl. 210—52)

This invention relates broadly to a method for separating from aqueous suspension finely divided solids the specific gravity of which only slightly exceeds that of the suspending liquid, and specifically to the separation of finely divided cellulose from the product of digestion of kelp with alkaline agents. This application is a continuation-in-part of our co-pending application Serial No. 254,602, filed November 2, 1951, entitled "Method of Clarifying Crude Solutions of Alginates."

A purpose of the invention is to so reduce the proportion of suspensoid by a preliminary treatment as greatly to accelerate a final step of clarification by filtration, and to reduce the cost of the final step.

A purpose of the invention is to effect, by a combination of steps of air flotation and sedimentation, a degree of separation of the suspensoid which cannot be accomplished by the use of either step alone.

A purpose of the invention is to remove cellulose from a crude algin solution in such manner as to minimize depreciation of the algin by depolymerization and fermentation.

A purpose of the invention is to reduce the loss of algin by retention of solution in the filter cake which occurs when a crude alginate solution containing all the cellulose of the kelp is filtered.

A purpose of the invention is to so accelerate the steps of flotation and separation that they may be conducted at a high temperature at which bacterial degeneration is inhibited, without experiencing the degeneration by depolymerization which accompanies prolonged exposure of alginic liquids to such temperatures.

A purpose of the invention is to increase the yield of soluble alginate from given kelp digestion product simultaneously with the separation of the cellulose therefrom.

The separation of finely divided solids from suspension in aqueous liquids may become very difficult when the specific gravity of the solid closely approaches that of the liquid and when the character of the solid renders it difficult to remove by filtration. The difficulty is exaggerated if the suspending liquid is itself viscous, or if the proportion of suspensoids be high enough to impart a material apparent viscosity to the suspension. It is also exaggerated by the presence in the liquid medium of a valuable but unstable solute, one which is liable to depreciation in value by depolymerization, oxidation or bacterial action.

A typical case in point is the problem of separating the cellulosic residue from the product of alkaline digestion of a kelp containing alginic materials, for example the giant brown kelps, Macrocystis, Fucus, Nereocystis and Laminaria. In this operation the chopped kelp is digested and macerated, at a relatively high temperature, with a dilute aqueous solution of a mild alkali, as for example sodium carbonate. The product of this digestion is a viscous aqueous solution of the reaction product, sodium alginate, holding in suspension the very finely divided cellulose resulting from the breaking down of the kelp structure. This cellulose is highly hydrated and of a gelatinous character.

The digestion product is utilized, after removal of the cellulose, by reconverting it to insoluble alginic acid which is then transformed into such salts as may be required by the trade. As most of these salts are water-soluble and must be at least substantially free from insoluble matter, the essential step immediately following digestion of the kelp is to remove the cellulose from the digestion product or crude alginate solution.

For separating a suspensoid from its suspending liquid, three basic methods are available: air or gas flotation, by which the solids are brought to and skimmed from the upper surface of the liquid; sedimentation, either by simple settling or accelerated by centrifuging, and filtration. Of the three, only the last has been found to meet the necessities of the case under consideration.

Air flotation is effective for removing part of the cellulose, but as the proportion of suspensoid decreases it becomes less and less effective. To approach complete removal of the cellulose the step must be several times repeated, requiring elaborate apparatus having high prime and maintenance costs, with long retention of the alginic liquor in the treatment, the risk of severe damage to the properties of the algin by depolymerization and fermentation, and excessive loss of algin in the skimmings.

Sedimentation is equally undesirable for similar reasons. It is extremely slow so long as the concentration of cellulose is high, as it must be in the digestion liquor when diluted to the maximum extent permissible in view of subsequent operations. Thus simple settling requires extremely large or numerous vessels and involves long retention of the liquor in the process, causing severe damage by depolymerization and by bacterial action in the layer of sediment.

The use of centrifugal separators reduces the time element but is unduly costly, by reason of the high power consumption due to the high centrifugal force required to discharge large quantities of the semigelatinous cellulose from the machine. In both settling and centrifuging it is also very difficult to maintain the continuity of operation which is essential in handling unstable liquids.

For these reasons, and the still more important reason that the results of filtration are dependable and predictable, it has become accepted practice to clarify the digestion product by filtration, after only such degree of dilution as produces the maximum overall economy in the balance of decreasing filtration cost against increase in certain subsequent costs of manipulation as the degree of dilution is increased.

While clarification by filtration alone is accepted practice, it is still a difficult and tedious operation, and unduly costly, in fact the most costly single step in the manufacture of soluble alginic salts from kelp. These disadvantages follow from the high viscosity of the digestion liquor at the optimum dilution, the large volumetric proportion of cellulose in the raw liquor, the semigelatinous condition of the cellulose, and the consequent very large proportion of filter aid required to retain it, together with the high loss of algin by retention in the press cake.

We have discovered that the cost of filtration and the plant investment required for that step may be greatly reduced, and the yield of algin from any given digestion product materially increased, by the use of a process combining the steps of flotation, sedimentation and filtration in the following manner:

A. The digestion product is diluted to approximately the concentrations of algin and cellulose which would be optimum in the present practice of clarifying by filtration without preliminary treatment;

B. The diluted "crude liquor" is subjected to a step of air flotation with the removal of more or less one-half of the cellulose (35% to 65%), thus greatly accelerating the next step;

C. The partially clarified liquor from the above step is subjected to a step of sedimentation, preferably by simple settling but less desirably by centrifuging, in which from 25% to 40% of the original cellulose content of the crude liquor is removed;

D. The "primary liquor" from the above step, now containing from 10% to 25% of the original cellulose content, is finally clarified by filtration, in the usual manner, but at a much more rapid rate and at a reduced cost;

E. The thickened cellulosic residues from steps B and C are strongly diluted with fresh water, preferably with the addition of small quantities of an alkaline agent, and are subjected to a repetition of steps B and C;

F. The thickened cellulosic residue from step E, now containing only a minute proportion of the algin originally present in the crude liquor, are withdrawn from the system, to waste or to other uses;

G. The highly diluted "secondary liquor" from step E, containing the greater part of the soluble alginate carried down from step C, and an additional quantity resulting from reaction between added alkali and insoluble alginic materials present in the residues from step E, is returned to step A to produce the initial dilution of the digestion product as it enters the system.

All of the above steps are carried out continuously, on flowing streams of the various liquids, and the entire operation is completed in so short a time that it may be conducted at as high a temperature as may be desired without damage to the properties of the alginic salt which is the primary product of the operation.

Figure 3:
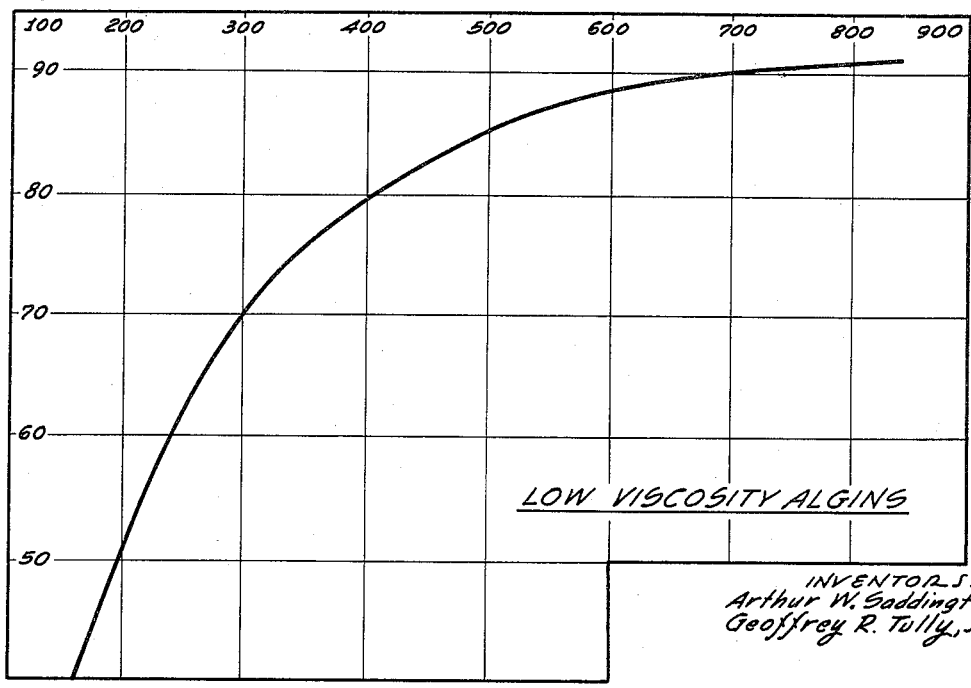

While the process above summarized is applicable to a variety of separations of suspensions, it is here illustrated as applied to a kelp digestion product as offering a particularly difficult problem, in the attached drawings, in which, Fig. 1 is a flowsheet of the process, utilizing only conventional apparatus elements suitable for its performance;

Fig. 2 is a diagrammatic representation of a single unit in which the steps of flotation and sedimentation may be combined, and Figs. 3 and 4 show curves illustrating the effect on the rapidity of filtration of variations in cellulose content at constant filtrate viscosity.

Referring first to Fig. 1, 10 represents a blending tank into which the concentrated digestion product is delivered at 11 from digesting apparatus not shown. This vessel receives at 12 a stream of highly diluted solution from the secondary separation later described, and the two solutions are blended as by any mixer 13. The dilution at this point should be sufficient to permit any heavy solids to settle out cleanly in the surge tank 14 into which the blended liquor is delivered by a pump 15.

The digestion product may at times contain an appreciable quantity of sand, shell fragments and the like, of relatively high specific gravity. These solids, if passed forward, would interfere seriously with later operations.

The surge tanks should be in duplicate, and each should be of such capacity as to allow the finest sand to settle completely, as for example, to hold an hour's supply to the ensuing separating steps. The sand is withdrawn occasionally, as indicated at 16.

The essentials in this first stage in the process are that the digestion product should be fully blended with the secondary liquor and that the blend be allowed to remain at rest or in very slow motion until any heavy solids have settled out, this being too brief a period for the subsidence of any appreciable quantity of cellulose. It will be evident that these essentials may be met by a variety of details of manipulation. For example, if two surge tanks 14 are provided, the blending tank 10 may be omitted, both the digestion product and the stream of secondary liquor passing into the intake of pump 15, which may be of such form as to be an effective mixing device. Further, the requirement for duplicate surge tanks may be avoided by providing a single tank of sufficient volumetric capacity with a vertical central partition (dotted line 14') terminating above the bottom of the tank, the liquid then being introduced into and withdrawn from opposite sides of the partition at points adjacent the upper liquid level. Such details are matters of convenience only.

The sand-freed liquor is pumped as at 17 to a feed tank 18 which is maintained at constant level, as by an overflow 19 returning to the surge tank, or, preferably, by controlling the delivery of pump 17. In or on its way to the feed tank the liquor is further diluted to the viscosity at which it is preferred to operate the subsequent primary separation steps.

This dilution will ordinarily be produced by the addition of the remainder of the highly dilute solution from the secondary separation, as through conduit 20, the quantity of fresh water introduced into the secondary separation being so controlled as to provide the degree of dilution required in the primary stage. On occasion, however, as for example in starting up the cycle, the primary dilution may be produced in part or entirely with fresh water.

So long as the supply of diluting liquid and the quality of the digestion product do not change, the viscosity of the crude liquor in the feed tank will remain constant, but this property should be determined at frequent intervals, or indicated continuously, and any minor fluctuations in viscosity corrected by regulation of a small stream of fresh water entering the system at 21, brought up to operating temperature in any heater 22 and controlled by a valve 23 in conduit 24. The maximum introduction of fresh water at this point will usually be very small.

The contents of the feed tank may desirably be kept in circulation by a mixer 25 or by an equivalent circulating pump, to avoid fluctuations in viscosity or temperature of the feed stream. The temperature of the liquid in the feed tank may be maintained sufficiently above the selected operating temperature in the primary flotation step to allow for temperature drop in transit, or if preferred a heating effect may be applied to the feed stream at any convenient intermediate point.

While no harm will result from the introduction into any of the separating steps of a liquid somewhat warmer than the body of liquid to which it is added, the introduction of a liquid even slightly colder will set up convection currents which may seriously interfere with or even inhibit the separation, this particularly in the sedimentation step. The separation of the undissolved cellulose should therefore be carried out under non-turbulent conditions as currents or turbulence may seriously interfere with or even inhibit the separation of said cellulose. The progression of temperature from the feed tank through the series of separating vessels will normally be a downward progression, due to unavoidable heat losses, and any heating effect necessary to maintain a desired temperature in any separating vessel will usually be applied to an entering liquid stream rather than to the liquid body in the vessel.

A constant volume stream of the crude liquor passes through conduit 26 and control valve 27 to the primary aerator 28, which may be of any preferred form. The conventional unit illustrated has a compartment 29 from which liquid overflows into a mixing tube 30 containing an impeller 31 which draws in air and beats it with the liquid to a froth which is collected in compartment 32.

A stream of the aerated liquid is withdrawn by the pump 33, which raises the stream to the desired pressure and discharges it into a retention chamber 34, which may be a standpipe as illustrated or any convenient enlargement of the pump discharge line. The purpose of this element is to increase the extent to which air dissolves in the liquid under pressure, this air being released in very minute bubbles when the pressure is relieved, as described in U. S. Patent 1,376,459 to Nils Pedersen. A few minutes only of residence in the retention chamber is sufficient.

The stream of aerated liquor leaving the upper end of the retention chamber is introduced into the primary flotation tank 35 as through a perforated feed pipe 36 arranged across one end of the rectangular cell.

The cellulose particles to which air bubbles have become attached rise rapidly to form a thick scum on the surface of the liquid. This scum is skimmed off by flexible vanes 37 which dip beneath the surface of the liquid and are carried on an endless belt 38. These vanes urge the thick suspension of cellulose up an inclined ramp 39 and into a launder 40 from which it is drained by a conduit 41. The disposition of this fraction, for convenience termed "primary top mud," is later described.

The liquid from which the flotation layer has been skimmed, still containing considerable cellulose in suspension, passes through a conduit 42 into primary sedimentation cell 43, into which it is introduced at a medial level, the liquid being well distributed over the area of the vesssel as through perforated distributing pipes 44. In this cell a fairly large proportion of the remaining cellulose settles with relative rapidity, by reason of the reduction in cellulose content of the liquid in the prior flotation step.

The "primary bottom mud" collecting in the lower part of this shell is drained off through a conduit 47, a constant level being maintained in cells 35 and 43 as by an overflow pipe 45 vented to the air at 45′ to prevent siphoning, or by a suitable swingpipe, the two cells being kept at the same level by communicating conduit 42.

The primary liquor, containing all but a small part of the algin content of the crude liquor and a much reduced proportion of cellulose, passes out of sedimentation cell 43 through conduit 46, ordinarily to a filtering station or for use without filtration under certain circumstances later described.

The muds withdrawn from the primary cells are suspensions of cellulose in a solution containing a minor but material part of the soluble alginate originally present in the crude liquor, while the cellulose of the mud contains a residue of insoluble alginic material which is capable of recovery. The two primary muds are therefore collected in conduit 47 and introduced into a secondary aerator 48 in which they are diluted by a stream of fresh water passing from heater 22 through conduit 49 and control valve 50, with the (optional) addition of a stream of an alkaline solution (e. g., of sodium carbonate) as at 51.

The diluted muds from aerator 48 are passed to a secondary flotation cell 52, in which a secondary top mud collects and from which it is discharged through conduit 53, and thence to a secondary sedimentation cell 54 from which a secondary bottom mud is drained through conduit 55. The accessory elements present in the primary circuit are repeated in the secondary and need not be again described.

The secondary muds discharged through conduit 53 and 55 contain only a small proportion of the algin originally present in the crude liquor and preferably are discarded. While this algin is in large measure recoverable by passage through a tertiary cycle, the recovery will not usually repay the investment.

The highly diluted secondary liquor from cell 54 is withdrawn from the upper portion of the cell, as at 56, and discharged by a pump 57 into a conduit 58 which supplies branch lines 12 and 20 with liquid for diluting the digestion product as above described.

The quantity of fresh water added to the secondary aerator is the predetermined quantity required to dilute the digestion product to the preferred operating viscosity. The quantity of alkaline solution added at 51 is that which maintains the pH values of the liquids in the secondary cells at the optimum levels, as will be described.

In Fig. 1, separate flotation and sedimentation cells are illustrated to facilitate description of the method steps. The process, however, is not so limited, in fact it may be carried out to better advantage in apparatus in which these two steps are conducted in a single cell.

A cell of this type is illustrated in simplified form in Fig. 2, in which an elongated vessel 60 has a steeply inclined bottom 61 terminating in a trough 62 in which bottom mud collects and from which it is withdrawn at 63. A feed of aerated liquor is introduced through a perforated feed pipe 64, skimmers 65 carry the top mud into a launder 66 from which it is drained at 67, and the clarified liquor is withdrawn at 68. This single unit may replace either pair of cells 35 and 43 or 52 and 54 of Fig. 1, the other elements of the assembly remaining as shown in that figure.

It will be understood that the apparatus shown in these figures is conventional, is illustrated only to explain the method, and is not represented to be the best possible apparatus for the purpose. A highly refined apparatus assembly, capable of producing the maximum clarifying effect, is described and claimed in the copending application of A. W. Saddington and S. A. Coleman, filed November 2, 1951, under Serial No. 254,603, and entitled "Apparatus for Resolving Highly Stable Suspensions."

In order to obtain the best results in the application of the process to alginic and other solutions of unstable organic materials, it is desirable to observe certain precautions. Some of these will not be necessary in cases in which both solute and suspensoid are stable, as will be noted.

*Temperature*

The operating temperature may be varied at will from atmospheric to the maximum which the particular digestion product will tolerate without degradation of the final product. Ordinarily, in the case of alginic solutions, this temperature will be about 175° Fahr. though in many instances it may be as low as 150°. Elevation of the temperature to the limit fixed by increase in depolymerization is desirable as it lowers the viscosity of the solution and thus avoids undue dilution which, as noted above, is costly. Further, a temperature of 165° to 175° Fahr. has a very desirable pasteurizing effect on alginic solutions, substantially inhibiting bacterial degradation.

*Viscosity*

The preferred viscosity in the primary stage is in the narrow range from 15 cps. to 18 cps. at the existing temperature, but it is possible to operate this stage within the range from 11 cps. to 22 cps. Lowering the viscosity increases the effectiveness of both flotation and sedimentation, but where this lower viscosity is obtained by increasing dilution there is a corresponding increase in water consumption, in fuel for heating water, and in cost of subsequent operations on the clarified product.

The viscosity in the secondary stage will follow from that maintained in the primary and from the degree of fresh water dilution required. With the primary stage at 11 to 22 cps. the resultant viscosity in the secondary will usually range from 3 cps. to 12 cps. Ordinarily it is not desirable to allow the viscosity in the secondary stage to fall below 3 cps.

The viscosity figures mentioned above are those made with a Model MV Brookfield Continuous Viscosimeter, using a No. 1 spindle (55 mm.) rotating at 20 R. P. M.

*Alkalinity*

The hydrogen ion content of the various liquors is important as regards both the best functioning of the process and the final yield of soluble algin.

It is desirable to introduce the raw liquor into the primary stage at about pH 9.0 to 10.5, which is ordinarily accomplished by control of the digestion operation. In passing through this stage the pH value will usually drop appreciably, as by 0.1 to 0.5 pH unit, due to reaction between residues of free sodium carbonate and of unreacted alginic materials in the cellulose. This further reaction is due in part to extension of digestion time, in part to greater dilution of the solution.

The nature of the insoluble alginic materials present in the digestion product is uncertain. It is known that some calcium alginate occurs in some species of kelp; insoluble metallic alginates may be formed in digestion of the kelp with hard waters, and it is probable that some free alginic acid may remain in plant structure not completely broken down in digestion and maceration.

Whatever the nature of the material, it is at least in part brought into soluble form and recovered in the separation steps when the pH value is maintained at a proper level.

In the secondary stage, the further reaction above described is much accelerated by the greater dilution of the liquor, and the pH will fall off rapidly unless an addition of alkali be made. As the further reaction in this stage is the means for recovering important quantities of algin which would otherwise pass out of the system with the rejected cellulose, it is desirable to add to the secondary stage, with the dilution water, sufficient alkali to maintain the pH value of the output secondary liquor at 9.0 or above.

This added recovery of soluble alginate, which cannot be had by increasing the quantity of alkali used in the digestion process and for that reason is unobtainable in the present method of filtering the crude liquor, will usually increase the final yield of algin from a given digestion product by at least ten percent and, in some cases, by twice that amount.

The advantages attending the application of the above method to the clarification of kelp digestion products are important.

First, the recovery of algin from a given kelp is materially increased, both by the further reaction in the secondary stage above described and by the lowering of loss in filtering.

In the prior art practice of filtering the crude liquor without a preliminary partial removal of the cellulose, the loss due to retention of solution in the press cake averages about 5% of the quantity of soluble alginate present in the digestion product, in addition to which all insoluble alginic materials are retained in the press cake and lost. In the instant process, in which only a liquor from which the greater part of the cellulose has been removed goes to the filtering step, the retention of soluble alginate in the press cake is rarely over 1% of the original content. This lower retention is due mainly to a great reduction in the proportion of filter aid required and the consequent reduction in press cake volume, but to a minor extent to the more open and permeable character of the press cake.

To this gain is added the recovery of the originally insoluble alginate in soluble form, and from it must be deducted the small amount of soluble algin discarded in the secondary muds.

Using as an example a digestion product containing 100# or 2.0% by weight sodium alginate, 75# or 1.5% cellulose and 10# or 0.2% water-insoluble alginic substances, the yields from the three alternatives of which the method is capable compare with each other and with the yield of the straight filtration method as in the following table:

Col. A—The complete process, including primary and secondary separations with addition of alkali to the secondary stage and a final filtration.
Col. B—The same, omitting the addition of alkali to the secondary stage.
Col. C—The same as A with the omission of the final filtration.
Col. D—The prior art process of filtration of the entire diluted digestion product.

|  | A | B | C | D |
|---|---|---|---|---|
| Algin in feed supply, lbs.: |  |  |  |  |
| Soluble | 100 | 100 | 100 | 100 |
| Insoluble | 10 | 10 | 10 | 10 |
| Total | 110 | 110 | 110 | 110 |
| Algin lost in secondary mud: |  |  |  |  |
| Soluble | 5 | 5 | 5 |  |
| Insoluble | 0 | 8 | 0 |  |
| Total | 5 | 13 | 5 | 0 |
|  | 105 | 97 | 105 | 110 |
| Algins retained in filter cake: |  |  |  |  |
| Soluble | 1 | 1 |  | 5 |
| Insoluble | 0 | 2 |  | 10 |
| Total | 1 | 3 | 0 | 15 |
| Final yield of soluble algin | 104 | 94 | ¹ 105 | 95 |

¹ This product is contaminated with enough residual cellulose to limit its value and utility.

The second advantage is in reduction of cost of the filtering operation. The removal, prior to filtering, of 75% or more of the original content of cellulose permits the addition of costly filter aid to be reduced to about three-tenths of the quantity formerly required, a single saving amounting to several cents per pound of finished product.

Further, the cost of cleaning and reconditioning the presses after each filtration cycle is reduced in direct proportion to an extension of the length of the cycle. The curves of Figs. 3 and 4 illustrate the remarkable extent to which the cycle is lengthened by the removal of only portions of the total content of cellulose.

These curves, in which length of cycle in terms of pounds of alginic acid in the filtrate received during the cycle is plotted against percentage removal of original cellulose prior to filtration, represent the composited results from fifty-eight filtering tests on solutions of low viscosity algins and of forty-eight tests on high viscosity algins.

While results of this character vary over some little range, due to unavoidable differences in conditions under which the tests are made, the number of individual tests is sufficient to give considerable weight to average results. The locations of these curves are believed to be sufficiently accurate to justify the conclusions that the effect of prior cellulose removal on yield of algin per cycle is unimportant up to about 60% removal with the low viscosity and 70% with the high viscosity algins, but that surprisingly great extension of cycle length is obtained in the area from 70% to 90% removal in both cases.

The locations and contours of these curves appear to us to indicate the following generalities:

*a.* That the maximum effect in lengthening of cycle is obtained with the final removal of about 90% of the original cellulose content;

*b.* That the optimum degree of removal, balancing cost of the preliminary separation against reduction in cost of filtering, is about 85% of the original content;

*c.* That in the case of the low viscosity algins, the removal of 75% of the original cellulose lengthens the filtering cycle length about 2.5 times and of 85% about 5 times;

*d.* That in the case of the high viscosity algins, the increase in length of filtering cycle is about 3.3 times with 75% removal and about 4.5 times with 85% removal of cellulose;

e. That with either type of algin, a total removal of less than 50% of the original cellulose content will no more than double the length of the filtering cycle and is unlikely to justify the cost of removal under ordinary circumstances.

It will be noted that the above observations are based on the digestion products of the giant brown kelps previously named and might not be valid in all cases. However, these are the kelps mainly used as the source of commercial algins, and the above figures indicate very important labor savings. Large working scale experience in the use of the process has shown that the labor saving alone is sufficient to offset the cost of the preliminary treatment, leaving economy of filter aid and increase in yield as clear gain.

A further advantage in the use of the process above described is found in the possibility of producing a marketable soluble alginic product without having recourse to filtration. For some industrial uses, as for example in boiler and evaporator treating compounds, can sealing compositions and asphaltic compositions, and as adhesives in fibrous products such as paper, the presence of 10% to 15% by weight of cellulose in the finished algin is unobjectionable while the 35% to 50% cellulose content of the digestion product renders the algins made from it useless for many such purposes.

To meet such demands it is necessary only to carry cellulose separation in the primary stage up to 80% or 90% of the original content, dispensing with the final filtration.

The essence of the invention is in the seriatim application of the steps of air flotation and sedimentation to a suspension of the general type above described. Neither step alone can be carried to the point at which its application to an unstable solution such as that of a soluble alginate will justify the cost.

Air flotation cannot be carried beyond about 50% removal without serious degradation of the algin and excessive cost. Sedimentation alone is almost completely ineffective without, in the most favorable circumstances, a degree of dilution which could not be tolerated, and is so slow that depreciation is excessive.

When these two steps are applied in the described order, flotation preceding sedimentation, a degree of cellulose removal by air flotation which is readily produced in a single pass enormously increases the settling rate. For example, the retention for one hour in the settling zone of a liquor from which half of the cellulose has been removed by flotation will remove an additional 25% to 40% of the original cellulose content, while equal retention under identical conditions of the crude liquor, containing all of the original cellulose, effects only an inappreciable removal.

This acceleration of sedimentation by a previous air flotation is highly remarkable and is difficult to explain. We are able to see three possibilities, without being able to evaluate them individually:

a. Even a very small weight proportion of the very bulky cellulose particles materially increases the measured viscosity of the suspension over that of the clear solution, and as high viscosity retards settling, a reduction in viscosity would tend to accelerate it. That this is not the sole reason is evidenced by the observation that an equal reduction in viscosity by dilution of the original suspension produces far less acceleration of settling than is produced by the partial removal.

b. There is the possibility that the manipulations incident to air flotation increase the settling rate of the remaining cellulose particles by increasing their average size, either by agglomeration or by selective removal of the finer particles.

c. There is the possibility that the increase in settling rate following removal of part of the cellulose is due to the greater spacing of the particles remaining in suspension, which are believed to carry identical electrical charges. Repulsion between similarly charged particles decreases rapidly as the particle spacing increases.

We do not know positively that any one or any combination of the above possible effects actually explains the acceleration of settling by prior partial removal of the cellulose by flotation. The facts remain, however, that the prior flotation step makes the sedimentation step useful whereas otherwise it is substantially useless for this purpose, and that the combination of the two steps provides a more effective and less costly means for greatly reducing the cellulose content of an alginic digestion product than has been known heretofore.

The steps of introducing the dilution water into a secondary stage of separation and of returning the secondary liquor to produce the primary dilution are not functionally essential in this process, as substantially the same removal of cellulose from the primary liquor can be produced by diluting the crude liquor with water and eliminating the secondary separation. The use of these steps, however, adds materially to the recovery of algin from the digestion product and thereby increases the practical value of the process. The same comment may be made as to the addition of alkali or other water softening agent to the secondary stage, the process being functional and useful without this addition, but at a lower level of economic desirability.

While the system as described to this point operates with outstanding success, the preferred practice of the invention is further characterized by recirculation of a portion of the primary liquor through the primary stage to cooperate with the secondary liquor in diluting the digestion product to the viscosity desired for the primary stage. The resultant change in the character of the liquor fed to the primary stage may be understood by comparison.

Suppose that the viscosity of the digestion product is 25 cps. at 160° F. and a viscosity of 18 cps. is desired for the liquor supplied to the primary stage. Without recirculation of a portion of the primary liquor the desired viscosity of 18 cps. will be attained by controlling the viscosity of the secondary liquor and to a minor extent by adding fresh water to the feed tank 18 when and if required. As heretofore explained the viscosity of secondary liquor is controlled by varying the quantity of water added to the primary muds. To attain the desired viscosity of 18 cps. in the primary liquor, the viscosity of the secondary liquor may be held, for example, at 9 cps. and the primary liquor discharged from the primary stage will have a viscosity on the order of 12 cps.

In operating the system with recirculation of primary liquor, for example, 25% of the primary liquor having the viscosity of 12 cps. may be fed back to the crude liquor entering the primary stage. The volume of flow through the primary stage may be increased correspondingly to maintain the input of crude liquor at the same rate as used without recirculation of the primary liquor, or if desired, the volume of flow may be increased further to raise the input of crude liquor.

It will be readily appreciated that recirculation in this manner raises the concentration of the alginate in the input to the primary stage and correspondingly reduces the proportion of suspended cellulose. It has been found that this change in the character of the input liquor results in increased efficiency in the primary stage that is more than commensurate with the increased rate of flow through the first stage. The yield of clear liquor is increased and the higher concentration of algin in the primary liquor substantially reduces the amount of calcium chloride reagent needed for the subsequent treatment of liquor to precipitate algin as the end product.

It has been found that the optimum concentration of alginate in the primary stage depends on the viscosity of the digestion product. If the digestion product has a relatively low viscosity, the concentration of sodium alginate in the primary stage with recirculation should be .35–.40% as compared to .25–.30% without recirculation. If the digestion product has a relatively high viscosity, the concentration of sodium alginate in the primary stage should be .30–.35% with recirculation as compared to .20–.25% without recycling the primary liquor.

In general a viscosity of 15 cps. to 18 cps. is desirable at the input of the primary stage when the primary liquor is recycled. It will be readily appreciated that the operation of the system with recirculation of primary liquor may be varied since there is a range of choice in the interrelated factors that determine the desired viscosity of primary stage input liquor. The percentage of the primary liquor may be varied. The amount of water added to the input of the secondary stage may be varied to raise or lower the viscosity of the secondary liquor and, of course, the addition of new water to the primary input may be varied.

It has been further found that recirculation of primary liquor in the manner described results in substantial saving in fuel. As heretofore stated the liquor fed to the input of the primary stage is heated to a temperature in the range of 150°–175° F. and reduction in the amount of water added to the system reduces the heating burden.

The structure of the system as described to this point may be adapted in various ways to carry out the desired recycling of a portion of the primary liquor. For example, as shown in Fig. 1, a suitable pump 70 may be placed in the primary liquor line 46 and on the high pressure side of the pump a branch conduit 72 may extend from the primary liquor line 46 to the feed tank 18. The proportion of the primary liquor that is recycled may be controlled, for example, by placing a valve 74 in the conduit 72 and a valve 75 in the line 46 beyond the branch point. These two valves may be adjusted to vary at will the proportion of the primary liquor that is returned to the feed tank 18 for recycling through the primary stage.

We claim as our invention:

1. The method of separating finely divided cellulosic solids from the concentrated solution of alginic salt produced by a prior digestion of kelp with an aqueous alkaline solution, comprising: diluting said digestion product to a desired viscosity with a secondary liquor produced in a later stage of the process; intimately blending with a stream of the resultant crude liquor a multitude of minute air bubbles; subjecting said air-blended crude liquor in a slowly flowing stream to consecutive effects of flotation and sedimentation and thereby separating a primary flotation mud and a primary sedimentation mud, each rich in cellulose, from a primary liquor lean in cellulose; withdrawing said primary liquor; collecting said primary muds and diluting the same with water; intimately blending minute air bubbles with a stream of the diluted muds and subjecting last said air blended stream to consecutive effects of flotation and sedimentation, thereby separating a secondary flotation mud and a secondary sedimentation mud, each rich in cellulose, from a secondary liquor substantially free from cellulose; withdrawing said secondary muds, and returning said secondary liquor to produce at least the greater part of first said dilution of said digestion product.

2. A method as described in claim 1, in which the viscosity of the diluted primary muds is maintained within the range from 3 centipoises to 12 centipoises, uncorrected for temperature.

3. A method as described in claim 1, in which the viscosity of the diluted primary muds is maintained above 3 centipoises, uncorrected for temperature.

4. A method as described in claim 1, in which the temperature of the liquids in the primary stages of separation is maintained substantially constant and within the range from 150° Fahr. to 175° Fahr.

5. A method as described in claim 1, in which the temperature of the liquids in the primary stages of separation is maintained at such level as substantially to inhibit bacterial action and degeneration of the algin thereby.

6. A method as described in claim 1, in which the primary flotation mud contains not less than 40% of the cellulose originally present in the crude liquor.

7. A method as described in claim 1, in which the cellulose content of the primary liquor is not to exceed 25% of the cellulose content of the crude liquor.

8. A method as described in claim 1, in which the quantity of water used to dilute the primary muds is controlled to yield the quantity of secondary liquor required to dilute the digestion product to the desired viscosity.

9. A method as described in claim 1, including the additional step of filtering the primary liquor with a filter aid to complete the removal of cellulose therefrom.

10. A method as described in claim 1, in which an addition of a water-soluble alkali is made to the diluted primary muds to replace alkali consumed in the secondary separation stage by reaction with water-insoluble alginic materials present in the suspended cellulose.

11. A method as described in claim 1, in which the hydrogen ion content of the secondary liquor is maintained above pH 9.0 by addition of alkali to the diluted secondary muds.

12. The method of reducing the undissolved cellulose content of an alginic digestion product which comprises: diluting said product with an aqueous liquid to a desired viscosity; establishing a slowly flowing stream of the diluted product; subjecting said stream first to a step of air flotation and subsequently to a step of sedimentation, the digested product being diluted with said aqueous liquid to a viscosity within the range from 11 centipoises to 22 centipoises at the temperature of the stream at the flotation step; withdrawing cellulosic concentrates from each of said steps and withdrawing a liquid of reduced cellulosic content from said sedimentation step; diluting said concentrates with water; subjecting the diluted concentrates to successive steps of air flotation and of sedimentation; rejecting secondary cellulosic concentrates produced in last said steps, and returning the liquid from which last said concentrates were withdrawn to provide first said diluting liquid.

13. A method as described in claim 12, in which the digestion product is diluted to a viscosity within the range from 15 centipoises to 18 centipoises at the temperature maintained in the stream at the flotation step.

14. The method of reducing the undissolved cellulose content of an alginic digestion product which comprises: diluting said product with an aqueous liquid and establishing a stream of the diluted product with the rate of dilution maintaining the viscosity of the stream substantially constant; subjecting said stream first to a step of air flotation and subsequently to a step of sedimentation; withdrawing cellulosic concentrates from each of said steps and withdrawing a liquid of reduced cellulosic content from said sedimentation step; diluting said concentrates with water; subjecting the diluted concentrates to successive steps of air flotation and of sedimentation; rejecting secondary cellulosic concentrates produced in last said steps, and returning the liquid from which last said concentrates were withdrawn to provide first said diluting liquid.

15. The method of reducing the cellulose content of an alginic digestion product which comprises: diluting said product with an aqueous liquid to a viscosity sufficiently low to cause any sand or other mineral matter to settle freely; separating the dilute product from such mineral matter by permitting the mineral matter to settle; establishing a slowly flowing stream of the diluted product; subjecting said stream first to a step of air flotation and subsequently to a step of sedimentation, the digested product being diluted with said aqueous liquid at a rate to maintain a given viscosity in said stream at said flotation step; withdrawing cellulosic concentrates from each of said steps and withdrawing a liquid of reduced cellulosic content from said sedimentation step; diluting said concentrates with water; subjecting the diluted concentrates to successive steps of air flotation and of sedimentation; rejecting secondary cellulosic concentrates produced in last said steps, and returning the liquid from which last said concentrates were withdrawn to provide first said diluting liquid.

16. The method of reducing the undissolved cellulose content of an alginic digestion product which comprises: diluting said product with an aqueous liquid to a desired viscosity; establishing a slowly flowing stream of the diluted product; subjecting said stream first to a step of air flotation and subsequently to a step of sedimentation by settling; withdrawing cellulosic concentrates from each of said steps and withdrawing a liquid of reduced cellulosic content from said sedimentation step, the quantity of cellulose removed in said flotation step being sufficient to accelerate materially the rate of settling in said sedimentation step; diluting said concentrates with water; subjecting the diluted concentrates to successive steps of air flotation and of sedimentation; rejecting secondary cellulosic concentrates produced in last said steps, and returning the liquid from which last said concentrates were withdrawn to provide first said diluting liquid.

17. The method of reducing the undissolved cellulose content of an alginic digestion product which comprises: diluting said product with a first aqueous liquid to provide a first solution of the digestion product of a desired viscosity; subjecting said first solution to a step of air flotation to separate a portion of the undissolved cellulose content; subsequently subjecting said first solution to a step of sedimentation to separate a further portion of the undissolved cellulose content and thereby obtain a primary clarified liquor; diluting said separated portions of the undissolved cellulose content with a second aqueous liquid to provide a second solution of the digestion product of a desired viscosity; subjecting said second solution to a step of air flotation; subsequently subjecting said second solution to a step of sedimentation to separate a further portion of the undissolved cellulose content thereby to obtain a secondary clarified liquor of substantially lower viscosity than said primary clarified liquor; and adding all of said secondary liquor to said first liquid together with a portion of said primary liquor to obtain a relatively high concentration of algin in said first solution for said first mentioned steps of flotation and sedimentation.

18. The method of reducing the undissolved cellulose content of an aqueous flowable alkaline solution of an alginic digestion product which comprises diluting a stream of said solution to a substantially constant viscosity within the range from 11 centipoises to 22 centipoises by the addition of a minute stream of water thereto, aerating said stream, passing said stream to a first non-turbulent zone, floating in the range of 35% to 65% of the undissolved cellulose to the top of said stream in said first zone, removing said floated cellulose from said first zone, passing the remaining portion of said stream containing a reduced undissolved cellulose content to a second non-turbulent zone, settling and removing more of the undissolved cellulose in said second zone to further reduce the undissolved cellulose content of said remaining portion of said stream, and removing from the upper portion of said second zone an effluent having an undissolved cellulose content of 10% to 25% of the original undissolved cellulose content of the alkaline solution.

19. The method as defined in claim 18 wherein the dilution of a stream of said solution occurs by the addition of a minute stream of water thereto at the temperature maintained in the next ensuing step.

20. The method of reducing the undissolved cellulose content of a dilute, flowable aqueous, alkaline solution of an alginic digestion product which comprises aerating a stream of said solution, passing said stream to a first non-turbulent zone, floating in excess of 35% of the undissolved cellulose to the top of said stream in said first zone and removing undissolved cellulose from the top of said stream to accelerate sedimentation of remaining undissolved cellulose, passing a remaining portion of said stream containing a reduced amount of undissolved cellulose to a second non-turbulent zone, settling a portion of the remaining undissolved cellulose in said second zone, and removing a clarified solution having less than 25% undissolved cellulose from the upper portion of said second zone.

21. The method for reducing the undissolved cellulose content of a dilute flowable aqueous solution of an alkaline digestion product having a pH in the range of 9 to 10.5 which comprises aerating a stream of said solution, passing said stream to a first non-turbulent zone, floating in excess of 35% of the undissolved cellulose to the top of said stream in said first zone for the removal of said floated undissolved cellulose from said stream, passing the remaining portion of said stream containing a reduced amount of undissolved cellulose to a second non-turbulent zone, settling a portion of the remaining undissolved cellulose in said second zone to further reduce the undissolved cellulose content of the solution in said second zone, and removing from the upper portion of said second zone a clarified solution of a still further reduced undissolved cellulose content.

22. The method of reducing the undissolved cellulose content of a dilute, flowable, aqueous, alkaline solution of an alginic digestion product which comprises aerating a stream of said solution, passing said stream to a first non-turbulent zone, floating in excess of 35% of the undissolved cellulose to the top of said stream in said first zone and removing undissolved cellulose from the top of said stream to accelerate sedimentation of remaining undissolved cellulose, passing the remaining portion of said stream containing a reduced amount of undissolved cellulose to a second non-turbulent zone, settling a portion of the remaining undissolved cellulose in said second zone, removing a clarified solution having less than 25% undissolved cellulose from the upper portion of said second zone, and adding a portion of the said clarified solution to the said alkaline solution of an alginic digestion product to increase the percentage of algin therein for said steps of flotation and sedimentation.

References Cited in the file of this patent

UNITED STATES PATENTS

| | | |
|---|---|---|
| 787,814 | Wolff | Apr. 18, 1905 |
| 1,083,234 | Werst et al. | Dec. 30, 1913 |
| 2,036,922 | Clark et al. | Apr. 7, 1936 |
| 2,128,551 | Le Gloahec et al. | Aug. 30, 1938 |
| 2,220,574 | Little et al. | Nov. 5, 1940 |
| 2,246,224 | Streander | June 17, 1941 |
| 2,248,177 | Karlstrom | July 8, 1941 |
| 2,679,477 | Kivari et al. | May 25, 1954 |